United States Patent
Lu (10) Patent No.: US 11,600,884 B2
(45) Date of Patent: Mar. 7, 2023

(54) BATTERY PACK

(71) Applicant: Globe (Jiangsu) Co., Ltd., Jiangsu (CN)

(72) Inventor: Chuntao Lu, Changzhou (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 0 days.

(21) Appl. No.: 17/528,763

(22) Filed: Nov. 17, 2021

(65) Prior Publication Data

US 2022/0077533 A1  Mar. 10, 2022

Related U.S. Application Data (63) Continuation of application No. 16/811,061, filed on Mar. 6, 2020, now Pat. No. 11,211,665.

(30) Foreign Application Priority Data

Mar. 6, 2019  (CN) .......................... 201910167018.3

(51) Int. Cl.
- *H01M 50/213* (2021.01)
- *H01M 10/42* (2006.01)
- *H02J 7/00* (2006.01)

(52) U.S. Cl.
CPC ....... *H01M 50/213* (2021.01); *H01M 10/425* (2013.01); *H01M 10/4207* (2013.01); *H01M 2010/4271* (2013.01); *H01M 2220/30* (2013.01); *H02J 7/0042* (2013.01)

(58) Field of Classification Search
CPC ........... H01M 50/213; H01M 10/4207; H01M 10/425; H01M 2010/4271; H01M 2220/30; H01M 50/204; H01M 50/247; H01M 50/271; H01M 50/284; H01M 50/296

See application file for complete search history.

(56) References Cited

U.S. PATENT DOCUMENTS

2014/0152261 A1* 6/2014 Yamauchi ............... B60L 58/24
                                                                 320/118
2019/0259984 A1* 8/2019 Nishikawa ................ B25F 5/02

\* cited by examiner

*Primary Examiner* — Stewart A Fraser
(74) *Attorney, Agent, or Firm* — Rooney IP, LLC (57) ABSTRACT

A battery pack includes a case, a first set of battery cells and a second set of battery cells received in the case, a circuit board, and a main power output interface. The first set of battery cells and the second set of battery cells can be connected in series or in parallel, and output two kinds of working voltage through the main power output interface. The battery pack further includes an extended power output interface and a switch provided between the first set of battery cells and the second set of battery cells. The battery pack can output a third voltage for an external device through the extended power output interface when the first set of battery cells and the second set of battery cells are connected in series through the switch. It's safe and reliable when charging the external device.

15 Claims, 12 Drawing Sheets

BATTERY PACK

CROSS-REFERENCE TO RELATED APPLICATIONS

This application is a continuation of U.S. application Ser. No. 16/811,061, filed Mar. 6, 2020, which claims priority to Chinese Application Serial No. 201910167018.3, filed on Mar. 6, 2019, the disclosures of which are hereby incorporated by reference in their entirety.

TECHNICAL FIELD

The present invention generally relates to a battery pack, and more particularly to a battery pack which can output at three different voltages.

BACKGROUND

The output of multiple voltages on battery packs has become a new trend in the electrical tool industry. The present dual-voltage battery packs include two sets of batteries that can output two sets of voltages. It is necessary to add a charging port (usually a USB interface) to recharge the phones and other devices. When using the USB interface, the USB circuit cannot take power from one set of battery alone, because this will cause the battery voltage on both sides to be unbalanced and there is a risk of use.

A safe and reliable battery pack that overcomes the above-mentioned problems is desired.

SUMMARY OF INVENTION

The aim of the present invention is to provide a safe and reliable battery pack which can supply power for mobile phones or other external devices.

In an aspect, a battery pack comprises a case, a first set of battery cells and a second set of battery cells received in the case, a circuit board, a main power output interface, a switch provided between the first set of battery cells and the second set of battery cells, and an extended power output interface. The first set of battery cells and the second set of battery cells can be connected in series or in parallel, and output two kinds of working voltages through the main power output interface. The battery pack can output a third voltage for an external device through the extended power output interface when the first set of battery cells is connected to the second set of battery cells in series through the switch.

In another aspect, a battery pack comprises a case, a first set of battery cells and a second set of battery cells received in the case, a main power output interface connecting to the first set of battery cells and the second set of battery cells via a first circuit, and an extended power output interface connecting to the first set of battery cells and the second set of battery cells via a second circuit. The main power output interface outputs two kinds of working voltages for power tools through connecting the first and second sets of battery cells in series or in parallel. The second circuit comprises a switch connecting the first set of battery cells and the second set of battery cells in series, and the extended power output interface outputs a third voltage for an external device when the first and second sets of battery cells are connected in series through the switch. The third voltage is different with that for power tools.

Other objects, advantages and novel features of the invention will become more apparent from the following detailed description of the present embodiment when taken in conjunction with the accompanying drawings.

DESCRIPTION OF EMBODIMENTS

Reference will be made to the drawing figures to describe the present invention in detail, wherein depicted elements are not necessarily shown to scale and wherein like of similar elements are designated by same or similar reference numeral through the several views and same or similar terminology.

Figure 1:
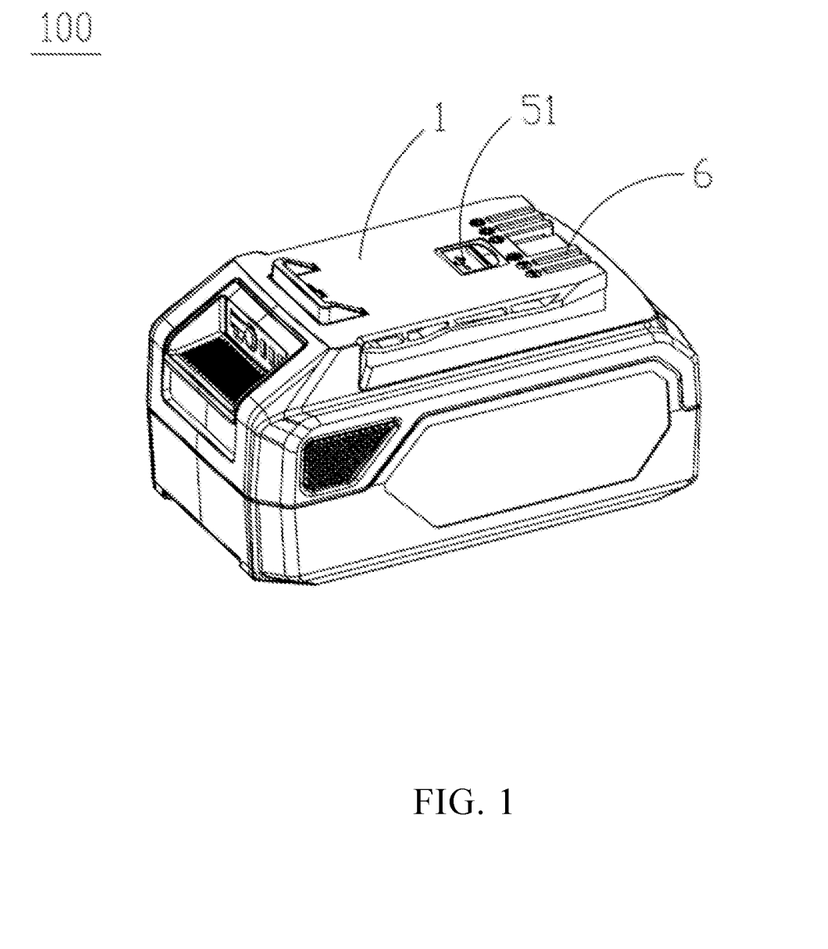
FIG. 1 is a perspective assembled view of a battery pack according to a first embodiment of the present invention.
Figure 2:
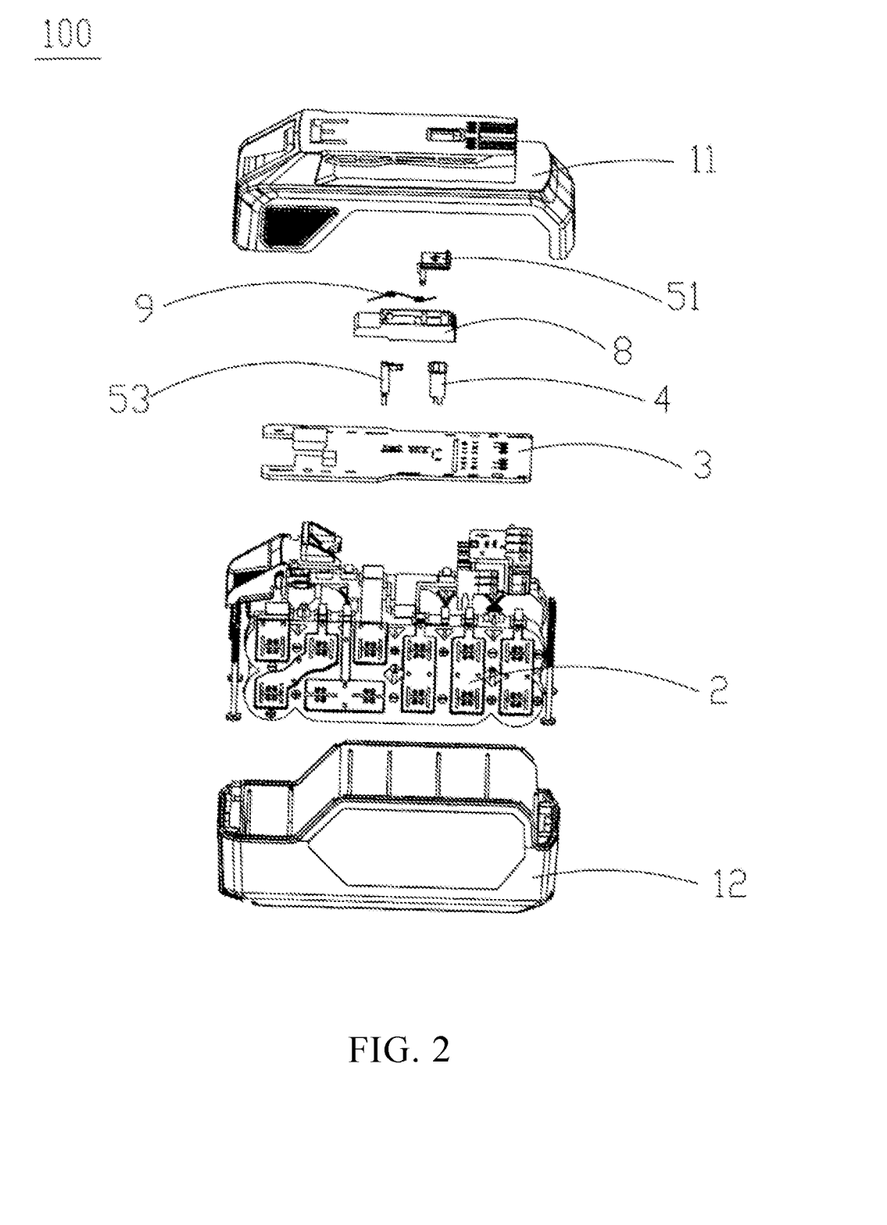
FIG. 2 is an exploded perspective view of the battery pack shown in FIG. 1.
Figure 3:
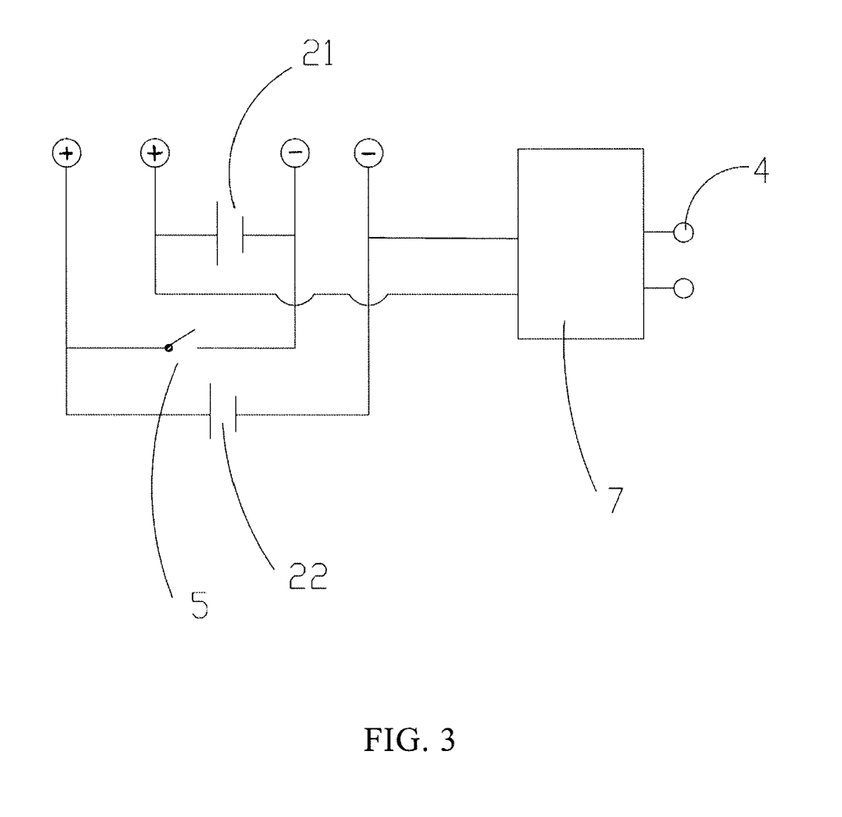
FIG. 3 is a circuit diagram of the battery pack supplying power to an external device through an extended power output interface thereof shown in FIG. 1.

Please referring to FIGS. 1 to 3, a battery pack 100 according to a first embodiment of the present invention includes a case 1, a battery set 2 received in the case 1, a circuit board 3 electrically connected to the battery set 2, a main power output interface 6 electrically connected to the circuit board 3, and an extended power output interface 4. The case 1 has an upper case 11 and a lower case 12. The battery set 2 includes a first set of battery cells 21 and a second set of battery cells 22. A switch 5 located between the first set of battery cells 21 and the second set of battery cells 22 is used for connecting or disconnecting the first set of battery cells 21 to the second set of battery cells 22.

The first set of battery cells 21 and the second set of battery cells 22 can be connected in series or in parallel, and output two kinds of working voltages through the main power output interface 6 in order to supply electricity for power tools with different requirements. Two kinds of working voltages include one low voltage and one high voltage. When the battery pack 100 is disconnected from the power tool, the first set of battery cells 21 and the second set of battery cells 22 can be connected in series and can supply power to a mobile phone or other external devices through the extended power output interface 4. The mobile phone or other external devices have working voltages different from two kinds of voltages supplied to power tools.

Please referring to FIG. 3, a circuit of the battery pack 100 for supplying power to the external device 4 includes the first set of battery cells 21, the second set of battery cells 22, the switch 5, a conversion circuit 7, and the extended power output interface 4. The switch 5 is arranged between two electrodes having different polarities, and one electrode is from the first set of battery cells 21, the other electrode is from the second set of battery cells 22. When the battery pack 100 is not charged or does not supply power to the power tools, the first set of the battery cells 21 and the second battery cells 22 are connected in series through the switch 5, so as to supply power for an external devices through the extended power output interface 4. The conversion circuit 7 is used to convert the high voltage of the battery pack 100 to a voltage required by the external device through the extended power output interface 4.

Figure 5:
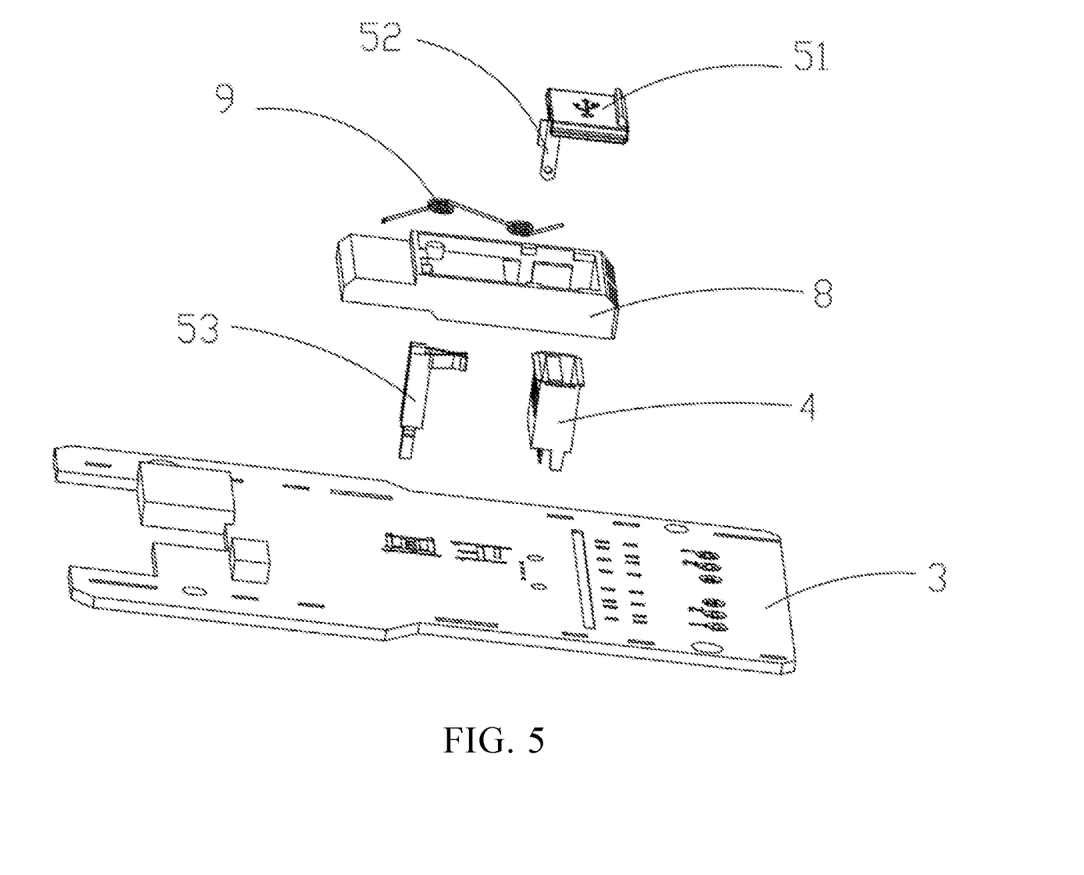
FIG. 5 is a partially exploded view of the battery pack shown in FIG. 2.
Figure 6:
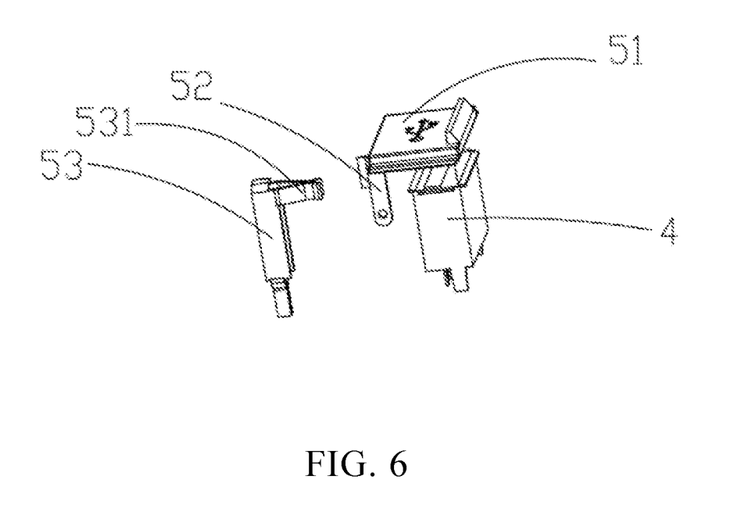
FIG. 6 is a partial view of a switch of the battery pack in the first embodiment of the present invention, showing the switch being in an open state.
Figure 7:
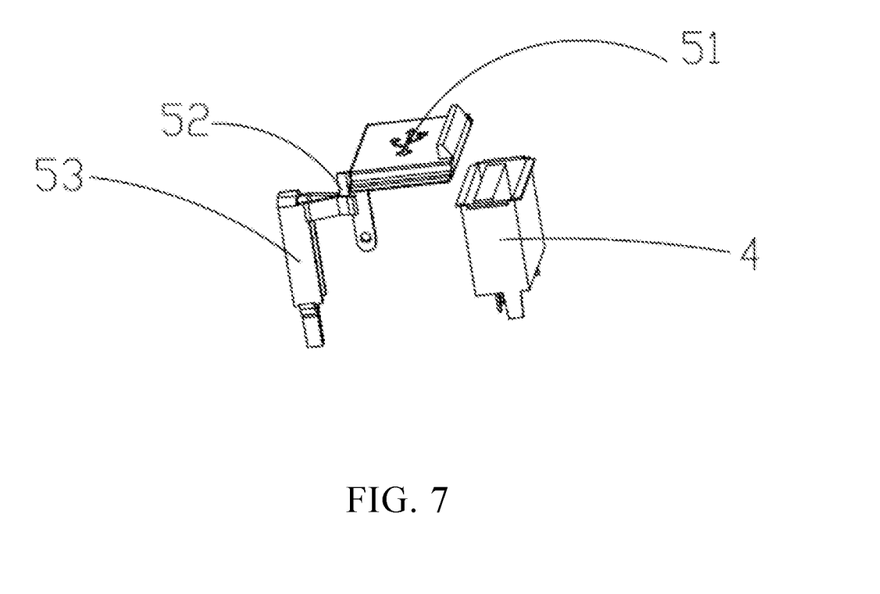
FIG. 7 is a partial view of the switch of the battery pack in the first embodiment of the present invention, showing the switch being in a closed state.

Please referring to FIGS. 5 to 7, the switch 5 includes a cover plate 51 shielding the extended power output interface 4, and a first terminal 52 connected to one electrode of the first set of battery cells 21 and a second terminal 53 connected to one electrode of the second set of the battery cells 22 which has different polarities with the electrode of the first set of battery cells 21. The connection and disconnection between the first terminal 52 and the second terminal 53 can be achieved through sliding the cover plate 51 to connect or disconnect the first terminal 52 to the second terminal 53.

The first terminal 52 and the second terminal 53 are both connected to the circuit board 3. The first terminal 52 is connected to one electrode of the first battery cells 21 through the circuit board 3. The second terminal 53 is connected to one electrode of the second battery cells 22 though the circuit board 3. The electrode of the second battery cell 22 which is connected to the second terminal 53 has polarity different with the electrode of the first battery cell 21 which is connected to the first battery cell 21. Specifically, the second terminal 53 includes a body portion (not labeled) and a clamping portion 531 extending from the body portion. The first terminal 52 is an insert piece disposed under the cover plate 51. The cover plate 51 is capable of sliding along a front to back direction of the battery pack 100. An upper part of the first terminal 52 inserts into the clamping portion 531 of the second terminal 53 to establish the contact between the first terminal 52 and the second terminal 53. The first terminal 52 is provided with a terminal section (not labeled) at a lower end thereof to electrically connected with the circuit board 3 through a wire (not shown). In other embodiments, the first terminal 52 and the second terminal 53 may be provided in other matching shapes, as long as the connection between the first terminal 52 and the second terminal 53 can be achieved.

Figure 4:
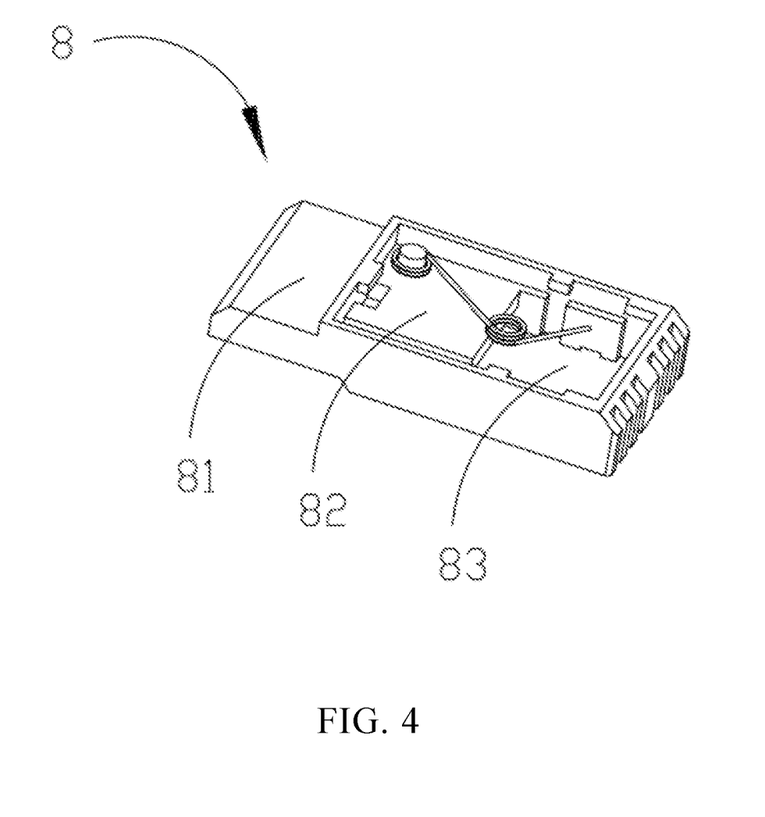
FIG. 4 is a perspective view of the stop block of the battery pack shown in FIG. 2.

The case 1 is provided with an opening (not labeled) at a top surface thereof for receiving the extended power output interface 4. Preferably, a stop block 8 is installed in the opening, as shown in FIG. 4. The stop block 8 includes a main body 81, a groove 82 provided on the main body 81 for accommodating the cover plate 51, and a through hole 83 located below the groove 82 for mating with the extended power output interface 4. The cover plate 51 is moved horizontally on the stop block 8 to expose or cover the extended power output interface 4.

An elastic element 9 is further provided between the cover plate 51 and the stop block 8. One end of the elastic element 9 is connected to the cover plate 51 and the other end of the elastic element 9 is connected to the stop block 8. The cover plate 51 is pushed by an external force so that the extended power output interface 4 is exposed. The cover plate 51 is reset under the action of the elastic element 9 in order to cover the extended power output interface 4. The elastic element 9 is preferably a torsion spring.

When the battery pack 100 is supplying power for the external device, the cover plate 51 is pushed to be open by the external force to expose the extended power output interface 4 for supplying power to the external device When the external device is finished charging, the elastic element 9 resets the cover plate 51 to cover the extended power output interface 4.

It should be noted that the extended power output interface 4 is not limited to the position shown in FIG. 1, and it may be disposed at any appropriate position of the battery pack 100. In addition, the number of the extended power output interfaces 4 is not limited and could be one or multiple. The extended power output interface 4 may be a USB interface or other charging interfaces, which is not limited herein.

Figure 8:
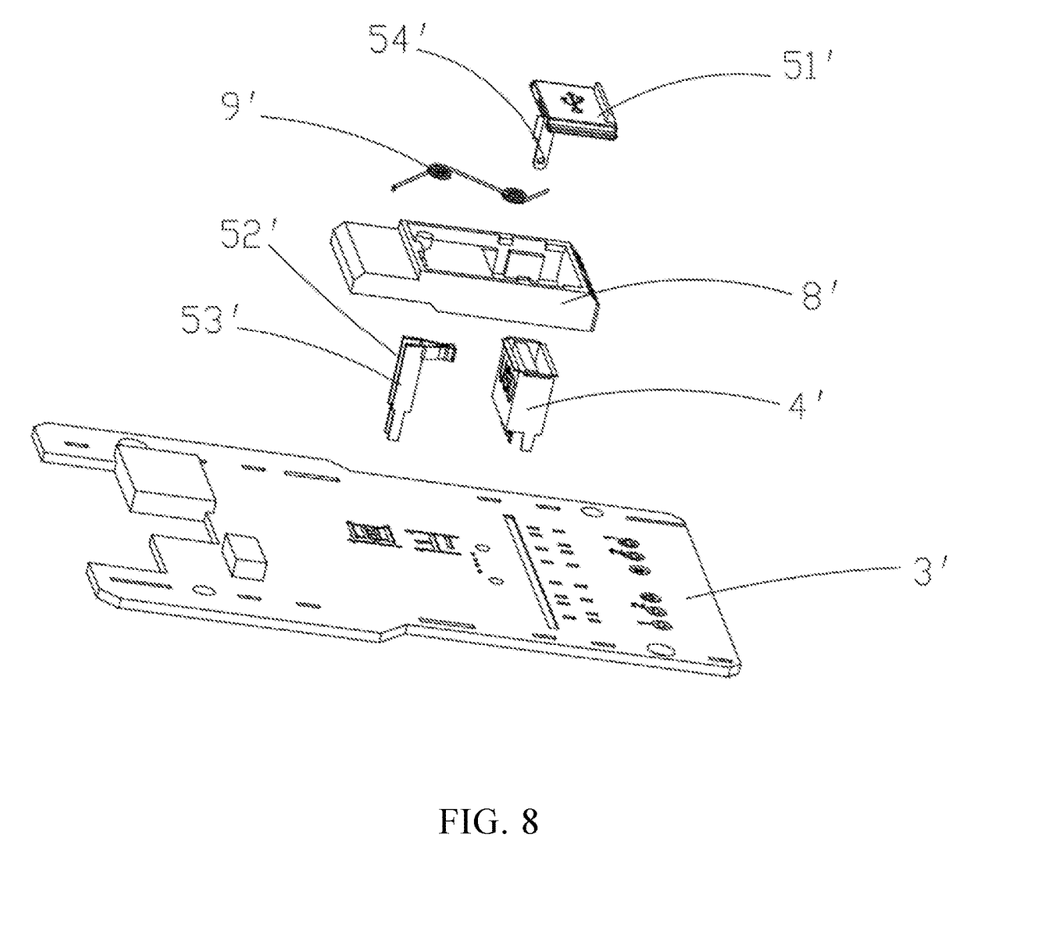
FIG. 8 is a partially exploded view of a battery pack according to a second embodiment of the present invention.
Figure 9:
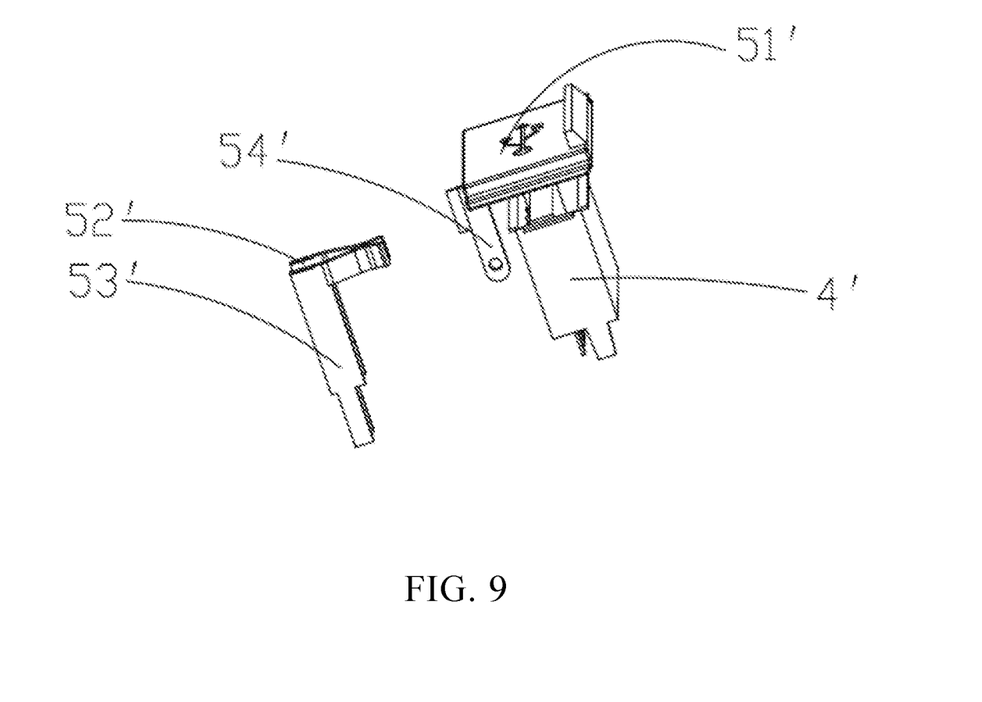
FIG. 9 is a partial view of a switch of the battery pack in FIG. 8, showing the switch being in an open state.
Figure 10:
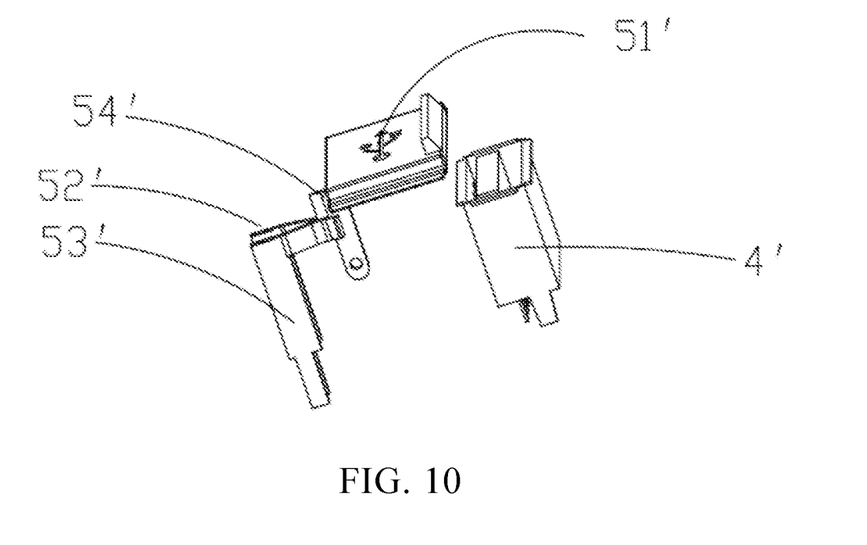
FIG. 10 is a partial view of the switch of the battery pack in FIG. 9 showing the switch being in a closed state.

Please refer to FIG. 8 to FIG. 10, a switch of a battery pack according to a second embodiment of the present invention is shown. The circuit board 3', the extended power output interface 4', the stop block 8', the elastic element 9' and other structures of the battery pack is substantially similar to the battery pack 100 in the first embodiment. The difference between the two embodiments is the structure of the switches. The following description will mainly describe the distinguishing features in detail, and the same features will not be described.

The switch includes a cover plate 51', a conductive terminal 54' provided on the cover plate 51', and a first terminal 52' and a second terminal 53' which are electrically connected to the circuit board 3', respectively. The first terminal 52' and the second terminal 53' are provided separately from each other and connect to electrodes of different polarities of the first and second set of battery cells 21, 22 through the circuit board 3', respectively. The distance between the first terminal 52' and the second terminal 53' is not greater than the thickness of the conductive terminal 54', so that the conductive terminal 54' can contact the first terminal 52' and the second terminal 53' at the same time. The conductive terminal 54' is formed with conductive material. The conductive terminal 54' can be inserted into and clamped by the first and second terminals 52', 53' when the cover plate 51' is moved under the external force, so that the extended power output interface 4 can be exposed and the battery pack can supply power to the external device through the extended power output interface. In other embodiments, the conductive terminal 54' may be provided in other shapes, as long as the connection between the first terminal 52' and the second terminal 53' can be achieved.

Figure 11:
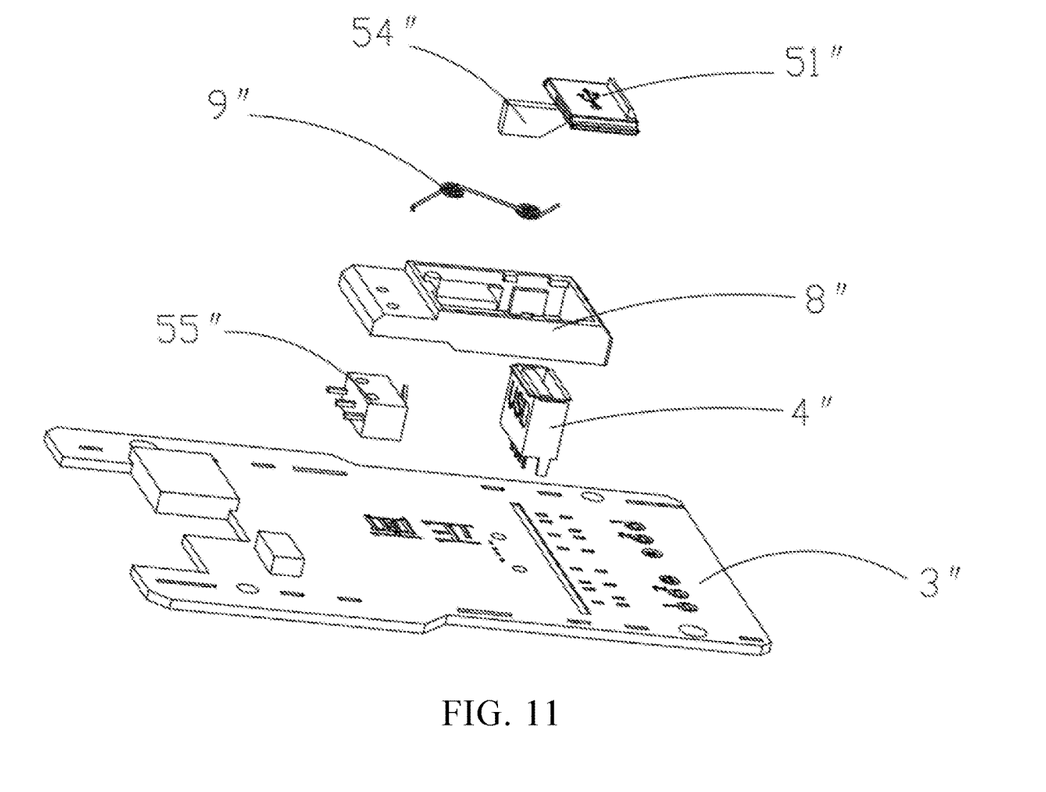
FIG. 11 is a partially exploded view of a battery pack according to a third embodiment of the present invention.
Figure 12:
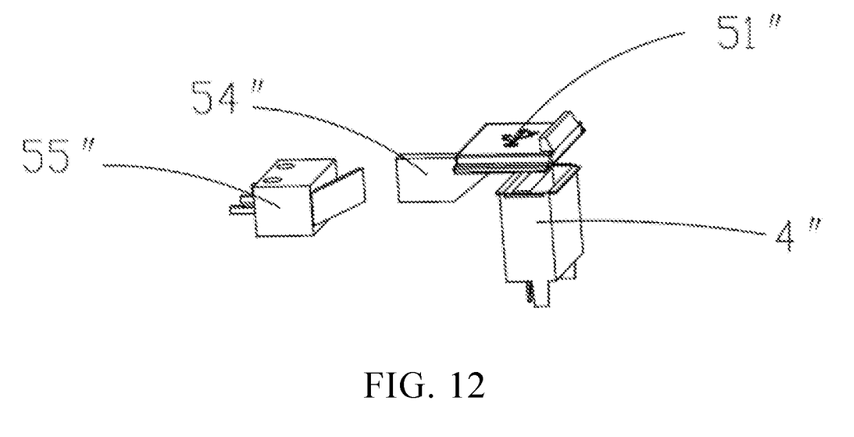
FIG. 12 is a partial view of the switch of the battery pack in FIG. 11 showing the switch being in an open state.

Please referring to FIG. 11 and FIG. 12, a battery pack according to a third embodiment of the present invention is shown. The circuit board 3", the extended power output interface 4", the stop block 8", the elastic member 9", and other structures of the battery pack are substantially the same as the battery pack 100 described in the first embodiment. The difference in the first and third embodiment is the structure of the switches. The following description will mainly describe the distinguishing features in detail, and the same features will not be described.

The switch includes a cover plate 51", a trigger terminal 54" provided on the cover plate 51", and a micro switch 55" electrically connected to the circuit board 3". The micro switch 55" includes a switch body, and a first terminal (not labeled) and a second terminal (not labeled) received in the switch body and electrically connected to the circuit board 3". The first terminal and the second terminal connect to the electrodes of different polarities of the first and second set of battery cells 21, 22 through the circuit board 3", respectively. The micro switch 55" further includes a contact point (not labeled) and a rectangular contact tab (not labeled) provided on the switch body. One end of the contact tab is fixed to the switch body and the other end is free. The contact point is located on the inner side of the contact tab and close to the fixed end of the contact tab. The contact tab repeatedly touches the contact point of the micro switch 55" by means of a lever. An elastic element (not shown) is provided between the contact tab and the switch body. The contact tab is actuated by the trigger terminal 54" to press the contact point and electrically connects the first terminal and the second terminal. The contact tab leaves the contact point under the action of the elastic element so that the contact point returns to an untriggered state, and the first terminal and the second terminal are disconnected. The trigger terminal 54" is preferably a plate which facilitates to push the contact tab to rotate.

The beneficial effects of the present invention include: applying a switch in the battery pack to replace the single-chip microcomputer control switch to control the circuit which prevents the short circuit caused by the single-chip microcomputer misjudgment, and improves the safety of the battery pack when supplying power to the external devices.

Terms such as "upper", "lower", "left", "right", "front", "rear", and the like indicating spatial relative positions are described for convenience of description of the relationship of one feature to another as shown in the accompanying drawings. It can be understood that, according to different product placement positions, the terms of spatial relative positions may be intended to include different positions other than the positions shown in the drawings, and should not be construed as limiting the claims. In addition, the terms "first" and "second" are used for descriptive purposes only, and cannot be understood as indicating or implying relative importance or implicitly indicating the number of technical features indicated.

In addition, the above embodiments are only used to illustrate the present invention and not to limit the technical solutions described in the present invention. The understanding of this specification should be based on those skilled in the art, although the present invention has been carried out detailed description with reference to the above embodiments, however, it should be understood by those skilled in the art, and those skilled in the art can still modify or equivalently replace the present invention, and all technical solutions and improvements without departing from the spirit and scope of the present invention should be encompassed within the scope of the claims of the present invention.

We claim:

1. A battery pack comprising:
   a case;
   a first set of battery cells and a second set of battery cells received in the case;
   a main power output interface configured to mechanically and electrically couple with tools of different operating voltage;
   an extended power output interface configured to supply power for an external device; and
   a switch electrically connected with the first set of battery cells and the second set of battery cells;
   wherein when the first set of battery cells and the second set of battery cells are connected in parallel, the main power output interface outputs a first operating voltage, when the first set of battery cells and the second set of battery cells are connected in series, the main power output interface outputs a second operating voltage, the second operating voltage is higher than the first operating voltage, and
   when the switch is closed, the extended power output interface is configured to output a third operating voltage.

2. The battery pack according to claim 1, wherein the battery pack has a conversion circuit, and wherein the third voltage is converted by the conversion circuit from the series connected first and second sets of the battery cells.

3. The battery pack according to claim 1, wherein the switch comprises a cover plate shielding the extended power output interface, a first terminal connected to one electrode of the first set of the battery cells, and a second terminal connected to one electrode of the second set of battery cells, and wherein the electrode connected to the first terminal has polarity different with the electrode connected to the second terminal, and wherein the connection or disconnection between the first and second terminals is achieved by sliding the cover plate.

4. The battery pack according to claim 3, wherein the first terminal is fixed on the cover plate, and the second terminal is fixed on the circuit board.

5. The battery pack according to claim 3, wherein the first terminal and the second terminal are both fixed on the circuit board.

6. The battery pack according to claim 5, wherein the cover plate is provided with a conductive terminal to electrically connect the first and second terminals.

7. The battery pack according to claim 5, wherein the first terminal and the second terminal are provided on a micro switch, and a trigger terminal is provided on the cover plate, and wherein the trigger terminal touches the micro switch to connect the first terminal with the second terminal.

8. The battery pack according to claim 1, wherein the case is provided with an opening and a stop block is installed in the opening, and the cover plate is provided on the stop block and capable of sliding on the stop block.

9. The battery pack according to claim 8, wherein the stop block is provided with an elastic element, and one end of the elastic element is connected to the cover plate, and the other end of the elastic element is connected to the stop block, and wherein the cover plate slides under an external force to expose the extended power output interface, and the cover plate is reset under the elastic element to cover the extended power output interface.

10. The battery pack according to claim 1, wherein the extended power output interface is a USB interface.

11. The battery pack according to claim 1, wherein the extended power output interface is a Type-C interface.

12. The battery pack according to claim 1, wherein the extended power output interface is disposed on the lateral side of the case.

13. The battery pack according to claim 1, wherein the battery pack has two extended output interfaces.

14. A battery pack comprising:
    a case;
    a first set of battery cells and a second set of battery cells received in the case;
    a main power output interface configured to mechanically and electrically couple with tools of different operating voltage;
    an extended power output interface configured to supply power for an external device; and a cover being movable relative to the extended power output interface, wherein when the cover is opened, the extended power output interface is exposed and when the cover is closed, the extended power output interface is covered;

wherein when the first set of battery cells and the second set of battery cells are connected in parallel, the main power output interface outputs a first operating voltage, when the first set of battery cells and the second set of battery cells are connected in series, the main power output interface outputs a second operating voltage, the second operating voltage is higher than the first operating voltage, and when the cover is opened, the extended power output interface is configured to output a third operating voltage.

15. A battery pack comprising:

a case;

a first set of battery cells and a second set of battery cells received in the case;

a first power interface configured to mechanically and electrically couple with tools of different operating voltage;

a second power interface configured to supply power for an external device;

wherein when the first set of battery cells and the second set of battery cells are connected in parallel, the first power interface outputs a first operating voltage, when the first set of battery cells and the second set of battery cells are connected in series, the first power interface outputs a second operating voltage, the second operating voltage is higher than the first operating voltage, wherein the second power interface is configured to output a third operating voltage, and the second power interface is different with the first power interface in size and shape.

* * * * *